May 10, 1938. L. A. STELLE 2,116,853
TOY
Filed June 21, 1937
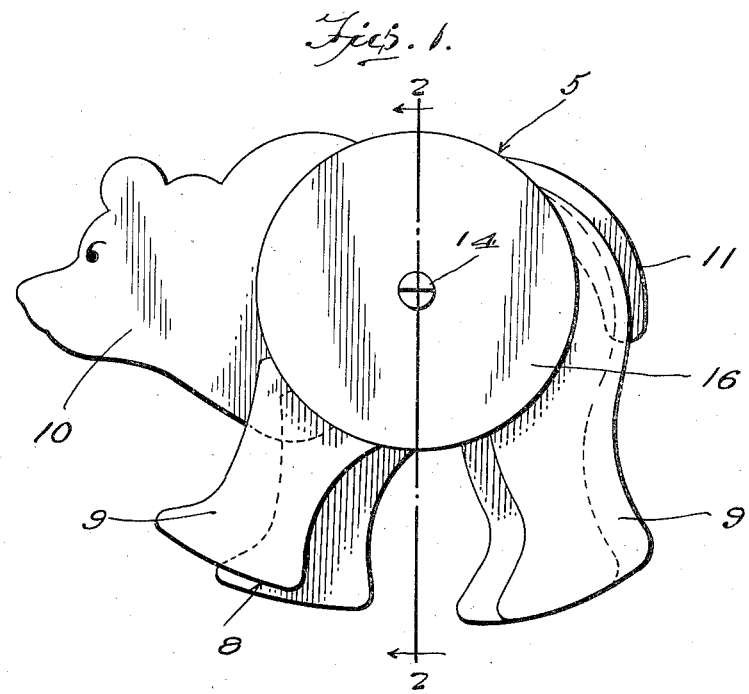
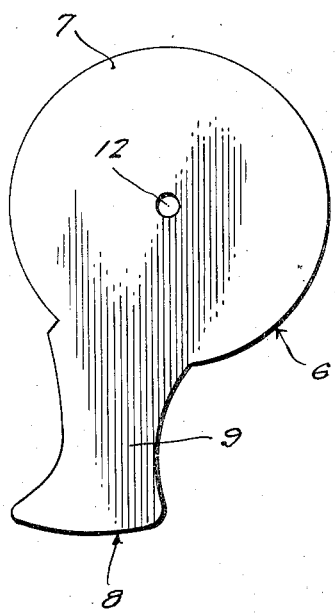
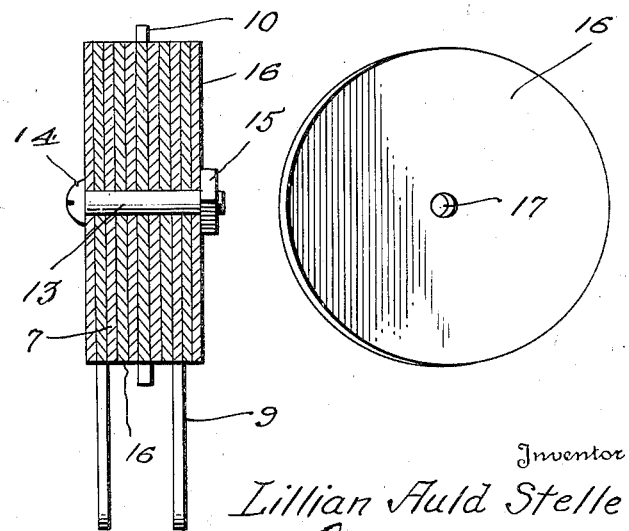
Inventor
Lillian Auld Stelle
By Henry T. Bright
Attorney

Patented May 10, 1938

2,116,853

UNITED STATES PATENT OFFICE 2,116,853

TOY

Lillian Auld Stelle, Eugene, Oreg.

Application June 21, 1937, Serial No. 149,511

4 Claims. (Cl. 46—161)

The present invention relates to toys and more particularly to an imitation animal figure embodying anatomical portions of sheet material and mounted on a common pivot for movement thereof in a manner to simulate different postures.

An object of the invention is to provide a group of anatomical elements mounted in predetermined relation to combine in forming an animal figure and in which the elements embody a disk-like hub portion having appendages extending radially therefrom and mounting the hub portion of all of the elements for movement about a common axis in simulation of different animal postures.

A further object is to provide a toy of this character in which the appendages may be arranged to support the animal in an upright natural position.

Another object is to provide a toy embodying the foregoing features of invention which is simple and practical in construction, relatively inexpensive to manufacture, which will not become easily broken and which is otherwise well adapted for the purposes intended.

Other objects and advantages reside in the details of construction and operation as more fully hereinafter described and claimed, reference being had to the accompanying drawing forming part hereof, wherein like numerals refer to like parts throughout and in which:

Figure 1 is a side elevational view;

Figure 2 is a vertical sectional view, taken substantially on a line 2—2 of Figure 1;

Figure 3 is a plan view of one of the anatomical portions, and

Figure 4 is a similar view of one of the spacing disks.

Referring now to the drawing in detail wherein for the purpose of illustration I have disclosed a preferred embodiment of the invention, the numeral 5 designates a toy animal constructed in accordance with my invention and formed of a plurality of anatomical portions 6 of sheet material and which includes a disk-like hub portion 7 and a radially extending portion 8 of a contour simulating one of the appendages of the animal such as a leg 9, or a head 10, or a tail 11.

The hub portion 7 corresponds to the body of the animal and each hub portion is provided with a central opening 12 for pivotally mounting on a pin 13 extending transversely of the animal body thus formed. One end of the pin is headed as at 14 while its opposite end is preferably threaded for threading a nut 15 thereon to produce a frictional engagement between the opposed faces of the hub portions to secure the same against idle movement after the appendages have been manually adjusted relative to each other to simulate a desired animal posture as will be apparent.

Spacing disks 16 are provided with central openings 17 for also pivotally mounting on the pin 13, said disks serving as spacers between the several anatomical portions whereby the legs 9 will be spaced apart transversely to support the toy in a normal upright position. In this connection it will be noted that one hind leg is positioned next to the outermost spacer on one side of the animal while one front leg is positioned next to the outermost spacer on the opposite side to equally space the respective front and rear legs in order to provide a better balance for the animal.

From the foregoing it will be apparent that each of the appendages of the several anatomical portions may be selectively manipulated to move the same about the pin in order to change the posture of the animal, many different and amusing postures thus being possible.

While I have disclosed a preferred embodiment of the invention it is obvious that numerous changes in construction may be made without departing from the spirit of the invention or the scope of the appended claims.

Having thus described my invention, what I claim is:

1. A toy comprising a plurality of anatomical elements, each embodying an annular portion representing the body of an animal, means connecting the annular portions for movement about a common axis and appendages carried by and extending radially from said annular portions for movement therewith.

2. A toy comprising a plurality of disk-like anatomical portions, means connecting said portions for pivotal movement about a common axis, and appendages carried by and extending radially from said anatomical portions, said connecting means producing frictional engagement between said anatomical portions to retain the appendages in a predetermined position.

3. A toy comprising a plurality of anatomical members each including a disk-like hub portion and a radially extending appendage, each of said hub portions having a central opening, a pivot pin inserted in the openings of said hub portions for mounting the members for movement about a common axis, and means securing the hub portions on the pin in frictional engagement with each other to retain the appendages in predetermined position relative to each other.

4. A toy comprising a plurality of anatomical members each including a disk-like hub portion and a radially extending appendage, each of said hub portions having a central opening, a pivot pin inserted in the openings of said hub portions for mounting the members for movement about a common axis, spacing members on the pin interposed between said hub portions to space the appendages apart, and means securing the hub portions and spacing members on the pin in frictional engagement with each other to retain the appendages in predetermined pivoted position relative to each other.

LILLIAN AULD STELLE.